United States Patent
Ham

(10) Patent No.: US 11,251,597 B2
(45) Date of Patent: Feb. 15, 2022

(54) PROTECTION ASSISTANCE DEVICE OF MULTIPLE CIRCUIT BREAKERS IN LOW-VOLTAGE SYSTEM

(71) Applicant: LS ELECTRIC CO., LTD., Anyang-si (KR)

(72) Inventor: Sungsik Ham, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 16/966,302

(22) PCT Filed: Nov. 21, 2018

(86) PCT No.: PCT/KR2018/014325
§ 371 (c)(1),
(2) Date: Jul. 30, 2020

(87) PCT Pub. No.: WO2019/172504
PCT Pub. Date: Sep. 12, 2019

(65) Prior Publication Data
US 2020/0373750 A1 Nov. 26, 2020

(30) Foreign Application Priority Data
Mar. 6, 2018 (KR) .................... 10-2018-0026464

(51) Int. Cl.
*H02H 3/28* (2006.01)
*H02H 3/36* (2006.01)
(Continued)

(52) U.S. Cl.
CPC .......... *H02H 3/042* (2013.01); *H02H 1/0061* (2013.01); *H02H 1/0092* (2013.01);
(Continued)

(58) Field of Classification Search
CPC ............... H02H 3/28; H02H 3/36; H02H 7/26
(Continued)

(56) References Cited

U.S. PATENT DOCUMENTS

| 4,335,437 A | 6/1982 | Wilson et al. |
| 5,905,616 A | 5/1999 | Lyke |

(Continued)

FOREIGN PATENT DOCUMENTS

| EP | 2551983 A1 | 1/2013 |
| JP | S56150919 | 11/1981 |

(Continued)

OTHER PUBLICATIONS

International Search Report for related International Application No. PCT/KR2018/014325; report dated Sep. 12, 2019; (5 pages).

(Continued)

*Primary Examiner* — Gary A Nash
(74) *Attorney, Agent, or Firm* — K&L Gates LLP

(57) ABSTRACT

The present disclosure provides a protection assistance device of multiple circuit breakers in a low-voltage system, in which protection assistance in both directions from the upper side to the lower side or from the lower side to the upper side is possible, and the number of wires for protection assistance between multiple upper/lower circuit breakers can be minimized. The protection assistance device includes at least one upper low-voltage circuit breaker; at least one middle low-voltage circuit breaker; at least one lower low-voltage circuit breaker; and a communication line which makes a communication connection between the low-voltage circuit breakers, wherein the low-voltage circuit breakers comprise a control unit for, when a trip operation of automatically breaking a circuit is performed, transmitting a communication packet for reporting a trip operation (Continued)

state to at least one predetermined circuit breaker among the circuit breakers through the communication line.

9 Claims, 3 Drawing Sheets

(51) Int. Cl.
  *H02H 7/26* (2006.01)
  *H02H 3/04* (2006.01)
  *H02H 1/00* (2006.01)
  *H02H 3/05* (2006.01)
  *H04L 12/705* (2013.01)
  *H04L 12/753* (2013.01)

(52) U.S. Cl.
  CPC .............. *H02H 3/05* (2013.01); *H04L 45/18* (2013.01); *H04L 45/48* (2013.01); *H02H 3/28* (2013.01); *H02H 3/36* (2013.01); *H02H 7/26* (2013.01)

(58) Field of Classification Search
  USPC ........................................ 361/62, 64, 66, 115
  See application file for complete search history.

(56) References Cited

U.S. PATENT DOCUMENTS

| | | | | |
|---|---|---|---|---|
| 6,496,342 | B1* | 12/2002 | Horvath | H02J 13/0086 361/65 |
| 2003/0231440 | A1* | 12/2003 | Papallo | H02H 7/262 361/3 |
| 2004/0130838 | A1* | 7/2004 | Papallo | H02H 7/261 361/62 |
| 2006/0279884 | A1 | 12/2006 | Valdes et al. | |
| 2008/0158752 | A1* | 7/2008 | Hill | H02H 7/30 361/64 |
| 2008/0198521 | A1* | 8/2008 | Weiher | H02H 7/262 361/64 |
| 2011/0127852 | A1* | 6/2011 | Papallo, Jr. | H02H 7/261 307/115 |
| 2012/0212348 | A1* | 8/2012 | Subramanian | H02H 7/30 340/638 |
| 2014/0063674 | A1* | 3/2014 | Ghoreishi | H01H 33/68 361/115 |
| 2014/0078628 | A1* | 3/2014 | Valdes | H02H 7/30 361/62 |
| 2015/0092309 | A1* | 4/2015 | Chen | H02H 7/30 361/64 |
| 2015/0162741 | A1 | 6/2015 | Valdes | |
| 2015/0318739 | A1* | 11/2015 | Oda | H02J 13/00034 700/292 |

FOREIGN PATENT DOCUMENTS

| | | |
|---|---|---|
| JP | H0213236 A | 1/1990 |
| JP | H02250627 A | 10/1990 |
| JP | H0787658 A | 3/1995 |
| JP | H0865898 A | 3/1996 |
| JP | H11206008 A | 7/1999 |
| JP | H11341706 A | 12/1999 |
| JP | 2002291147 A | 10/2002 |
| JP | 2011120459 A | 6/2011 |
| JP | 2013537636 A | 10/2013 |
| JP | 2014183664 A | 9/2014 |
| JP | 2016123203 A | 7/2016 |
| KR | 20030090480 A | 11/2003 |
| KR | 100865361 B1 | 10/2008 |
| KR | 101337565 B1 | 12/2013 |
| KR | 101621653 B1 | 5/2016 |
| WO | 03052897 A1 | 6/2003 |

OTHER PUBLICATIONS

Written Opinion for related International Application No. PCT/KR2018/014325; report dated Sep. 12, 2019; (6 pages).
Japanese Office Action for related Japanese Application No. 2020-546465; action dated Nov. 5, 2021; (10 pages).
Extended European Search Report for related European Application No. 18908601.0; action dated Nov. 10, 2021; (7 pages).

* cited by examiner

PROTECTION ASSISTANCE DEVICE OF MULTIPLE CIRCUIT BREAKERS IN LOW-VOLTAGE SYSTEM

CROSS-REFERENCE TO RELATED APPLICATIONS

The present application is a National Stage of International Application No. PCT/KR2018/014325, filed on Nov. 21, 2018, which claims the benefit of earlier filing date and right of priority to Korean Application No. 10-2018-0026464 filed on Mar. 6, 2018, the contents of which are all hereby incorporated by reference herein in their entirety.

Technical Field

The present disclosure relates to an efficient protection assistance device between a plurality of upper and lower circuit breakers in a low-voltage system.

BACKGROUND

A protection assistance device of multiple circuit breakers in a low-voltage system according to the related art will be described with reference to FIG. 1, which is a block diagram showing the configuration thereof.

In FIG. 1, the low-voltage system may include an upper power line (PL2) and a lower power line (PL1).

Here, the upper power line (PL2) is a power line close to a power transmission side, that is, a power source side, and the lower power line (PL1) is a power line close to a power receiving side, that is, a load side or an end power user.

In FIG. 1, reference numeral DL1 is a first branch line connected between the uppermost power line (not shown) and the upper power line (PL2) to supply power from the uppermost power line to the upper power line (PL2).

In FIG. 1, reference numeral DL2 is a second branch line connected between the upper power line (PL2) and the lower power line (PL1) to supply power from the upper power line (PL2) to the lower power line (PL1), and reference numerals DL3 and DL4 are third branch lines respectively connected between the lower power line (PL1) and a plurality of loads (power consumers) (not shown) to supply power from the lower power line (PL1) to the plurality of loads (power consumers).

An upper circuit breaker 30 is connected to the first branch line (DL1) in series to open and close the corresponding first branch line (DL1).

A middle circuit breaker 20 is connected to the second branch line (DL2) in series to open and close the second branch line (DL2).

Two lower circuit breakers 10-1, 10-2 are connected to the third branch lines (DL3, DL4) in series to open and close the corresponding third branch lines (DL3, DL4), respectively.

In FIG. 1, reference numeral SL1 is a first communication line for signal communication between the upper circuit breaker 30 and the middle circuit breaker 20.

Reference numeral SL2 is a second communication line for signal communication between the middle circuit breaker 20 and the lower circuit breakers 10-1, 10-2.

Reference numeral SL1a is a first connection signal line for connecting the upper circuit breaker 30 or the middle circuit breaker 20 to the first communication line (SL1) for signal communication, and reference numeral SL2a is a second connection signal line for connecting the middle circuit breaker 20 or the lower circuit breakers 10-1, 10-2 to the second communication line SL2 for signal communication.

Reference numeral CCL is a common connection line connecting an input terminal and a common terminal to indicate no input.

In each of the upper circuit breaker 30, the middle circuit breaker 20, and the lower circuit breakers 10-1, 10-2, reference numeral Z1 is a common terminal, and reference numeral Z2 is a zone selective interlock signal output terminal, which is an output terminal of a zone selective interlock signal for localization of a failure section, and reference numeral Z3 is a common terminal, and reference numeral Z4 is a zone selective interlock signal input terminal, and reference numeral Z5 is a ground fault dedicated input terminal.

The operation of a protection assistance device of multiple circuit breakers in a low-voltage system according to the related art as described above will be described.

In FIG. 1, when a failure such as over current, electric shortage, or ground fault occurs at point A (point A as a point on the second branch line (DL2)), the middle circuit breaker 20 connected on the second branch line (DL2) detects such a failure and performs an automatic circuit breaking (trip) operation to cut off power supply from the upper power line (PL2) to the lower power line (PL1).

Accordingly, the lower circuit breakers 10-1, 10-2 that receive power from the lower power line (PL1) and unshown load sides that receive power through the corresponding lower circuit breakers 10-1, 10-2 are in an outage state.

Furthermore, at the same time, the middle circuit breaker 20 outputs a zone selective interlock signal for localization of a failure section through the common terminal (Z1) and the zone selective interlock signal output terminal (Z2).

Then, the upper circuit breaker 30 receives the zone selective interlock signal through the common terminal (Z3), the zone selective interlock signal input terminal (Z4), and the ground fault dedicated input terminal (Z5) to determine that the middle circuit breaker 20 has performed a trip operation.

On the other hand, when the middle circuit breaker 20 fails a trip operation, the upper circuit breaker 30 that has received a zone selective interlock signal performs the trip operation to cut off power supply from the uppermost power line, which is not shown, to the upper power line (PL2).

In addition, a trip setting time (short time or long time, 0.2 seconds) of the middle circuit breaker 20 is set to be shorter than that (0.3 seconds) of the upper circuit breaker 30 so as to allow the upper circuit breaker 30 to perform a trip operation after the middle circuit breaker 20 first attempts a trip operation.

At this time, a load side (not shown) that receives power through the middle circuit breaker 20, the lower circuit breakers 10-1, 10-2 and the corresponding lower circuit breakers 10-1, 10-2 that receive power supply from the upper power line (PL2) is in an outage state.

In FIG. 1, when a failure such as overcurrent, electric shortage, or ground fault occurs at point B (point B as a point on the first branch line (DL1)), the upper circuit breaker 30 connected to the first branch line (DL1) detects such a failure to perform an automatic circuit breaking (trip) operation so as to cut off power supply from the uppermost power line (not shown) to the upper power line (PL2).

However, in the foregoing low-voltage system according to the related art, when the upper circuit breaker performs a trip operation, the protection assistance device of multiple of circuit breakers does not transmit a zone selective interlock signal to the lower circuit breaker, and there is a problem in that the circuit breaker and a load side lower than that must be powered off without any information, that is, a problem in that protection assistance is made in only one direction from the lower side to the upper side.

Moreover, in the foregoing low-voltage system according to the related art, the protection assistance device of multiple of circuit breakers must wire 5 signal terminals and 5 signal lines for protection assistance between the upper and lower circuit breakers to increase the number of wirings, and there is a problem in that the occupied wiring space and the wiring cost are excessive and the wiring work takes a long time due to a large number of wirings.

SUMMARY

Accordingly, an aspect of the present disclosure is to solve the foregoing problems of the related art, and to provide a protection assistance device of multiple circuit breakers in a low-voltage system capable of providing protection assistance in both directions from the upper to the lower side or from the lower to the upper side, and minimizing the number of wirings for protection assistance between the plurality of upper and lower circuit breakers.

An object of the present disclosure may be achieved by providing a protection assistance device of multiple circuit breakers in a low-voltage system, and the protection assistance device may include at least one upper low-voltage circuit breaker connected to a first branch circuit between an uppermost power circuit and an upper power circuit, and configured to have a communication unit; at least one middle low-voltage circuit breaker connected to a second branch circuit between the upper power circuit and a lower power circuit, and configured to have a communication unit; at least one lower voltage circuit breaker connected to a third branch circuit between the lower power circuit and a lowermost power circuit, and configured to have a communication unit; and a communication line that communicably connect the upper low-voltage circuit breaker, the middle low-voltage circuit breaker, and the lower low-voltage circuit breaker; wherein the upper low-voltage circuit breaker, the middle low-voltage circuit breaker, and the lower low-voltage circuit breaker include a controller that transmits a communication packet reporting a trip operation state to at least any one of the predetermined upper lower-voltage circuit breaker, the middle lower-voltage circuit breaker, and the lower low-voltage circuit breaker through the communication line, during a trip operation.

According to a preferred aspect of the present disclosure, the upper low-voltage circuit breaker, the middle low-voltage circuit breaker, and the lower low-voltage circuit breaker may be configured to be connected to each other in the form of a closed loop by an ethernet communication line.

According to another preferred aspect of the present disclosure, the upper low-voltage circuit breaker, the middle low-voltage circuit breaker, and the lower low-voltage circuit breaker may be connected to a high-speed dual ring communication network.

According to still another preferred aspect of the present disclosure, the controller may include a program storage unit for storing a rapid spanning tree protocol (RSTP) algorithm.

According to yet still another preferred aspect of the present disclosure, 5 the protection assistance device may further include a low-voltage circuit breaker additionally connected in the form of an open loop for unidirectional communication to at least any one of the upper low-voltage circuit breaker, the middle low-voltage circuit breaker, and the lower low-voltage circuit breaker, and communicably connected to another external communication network or a higher-level monitoring device.

According to still yet another preferred aspect of the present disclosure, the communication packet may include identification information of a destination circuit breaker, trip command information on a destination circuit breaker, status information of a source circuit breaker, and identification information of a source circuit breaker.

According to yet still another preferred aspect of the present disclosure, the trip command information may be composed of any one of short time delay trip information, ground fault delay trip information, and long time delay trip information.

According to still yet another preferred aspect of the present disclosure, the status information of the source circuit breaker may include operation status information and self-diagnosis information of the source circuit breaker.

In a protection assistance device according to the present disclosure, an upper low-voltage circuit breaker, an middle low-voltage circuit breaker and a lower low-voltage circuit breaker may include a controller that transmits a communication packet reporting a trip operation state through a communication line to at least one of the upper low-voltage circuit breaker, the middle low-voltage circuit breaker and the lower low-voltage circuit breaker during the trip operation to enable protection assistance in both directions from the top to the bottom side or from the upper side to the upper side or from the lower side to the upper side, and wiring for protection assistance between the plurality of upper and lower circuit breakers may configured with one or two communication lines, thereby having an effect of minimizing the number of wirings.

In a protection assistance device according to the present disclosure, the upper low-voltage circuit breaker, the middle low-voltage circuit breaker and the lower low-voltage circuit breaker may be configured to be connected to each other in a closed loop form by an Ethernet communication line, thereby obtaining an advantage of allowing bidirectional communication from the upper low-voltage circuit breaker to the lower low-voltage circuit breaker or from the lower low-voltage circuit breaker to the upper low-voltage circuit breaker.

In a protection assistance device according to the present disclosure, the upper low-voltage circuit breaker, the middle low-voltage circuit breaker, and the lower low-voltage circuit breaker may be connected by a high-speed dual ring communication network, thereby obtaining an effect of allowing bidirectional communication from the upper low-voltage circuit breaker to the lower low-voltage circuit breaker or from the lower low-voltage circuit breaker to the upper low-voltage circuit breaker and allowing communication at high speed.

In a protection assistance device according to the present disclosure, the controller may include a program storage unit for storing an RSTP algorithm, thereby obtaining an effect capable of processing to generate, transmit, store, or receive communication packets according to the RSTP protocol.

A protection assistance device according to the present disclosure is configured to include an additional low-voltage circuit breaker connected to at least one of the upper low-voltage circuit breaker, the middle low-voltage circuit breaker, and the lower low-voltage circuit breaker in the form of an open loop for unidirectional communication, and the corresponding additionally connected low-voltage circuit breaker may be connected to a network switch or a hub to obtain an effect of transmitting the information of the closed loop network to another communication network or a higher-level monitoring device.

In a protection assistance device according to the present disclosure, the communication packet may include identification information of a destination circuit breaker, trip command information on a destination circuit breaker, or status information of a source circuit breaker and identification information of a source circuit breaker, thereby obtaining an effect of discarding a received communication packet when the identification information of the source circuit breaker indicates itself or transferring the received communication packet to an adjacent circuit breaker when the identification information of the destination circuit breaker does not indicate itself.

In a protection assistance device according to the present disclosure, the trip command information may be composed of any one of short time delay trip information, ground fault delay trip information, and long time delay trip information, thereby having an effect of requesting a trip operation according to selective protection assistance to the other circuit breaker among a short time delay trip, a ground fault delay trip, and a long time delay trip.

In a protection assistance device according to the present disclosure, the status information of the source circuit breaker may include operation status information and self-diagnosis information of the source circuit breaker, thereby having an effect of allowing the destination circuit breaker to know the operation status and self-diagnosis results of the source circuit breaker.

DETAILED DESCRIPTION

The foregoing objective of the present disclosure, as well as the configuration and working effect thereof to accomplish the foregoing objective will be more clearly understood by the following description for preferred embodiments of present disclosure with reference to the accompanying drawings.

Figure 1:
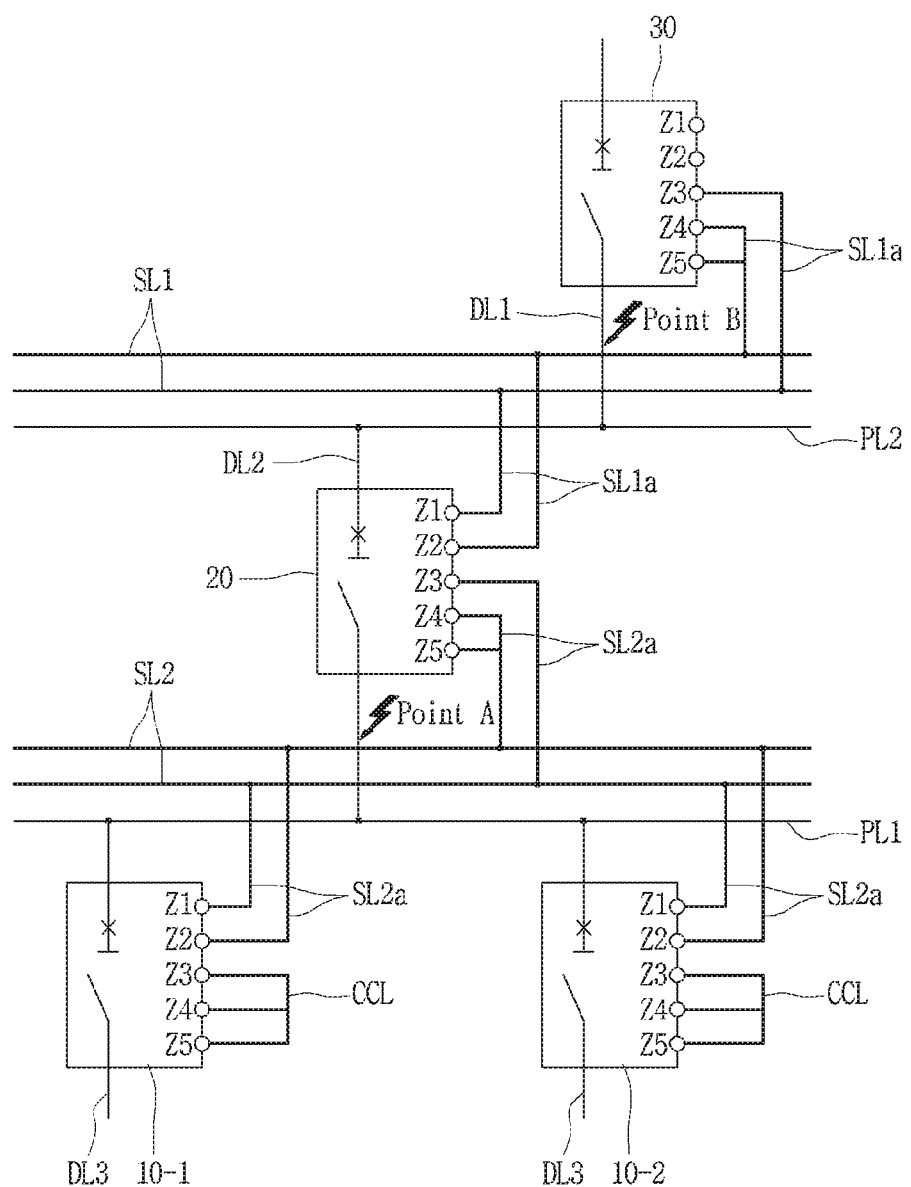
FIG. 1 is a block diagram showing the configuration of a protection assistance device of multiple circuit breakers in a low-voltage system according to the related art.
Figure 2:
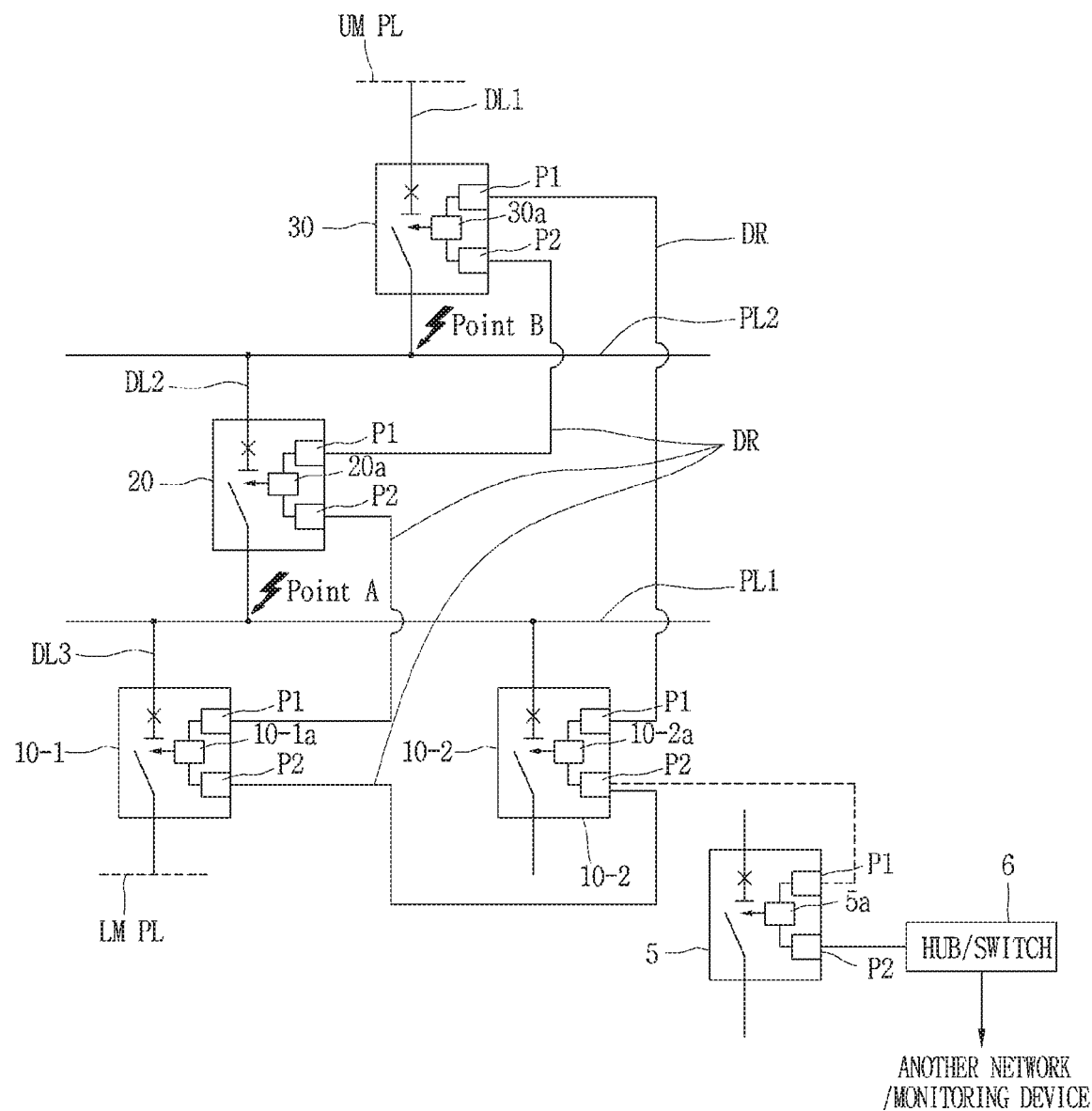
FIG. 2 is a block diagram showing the configuration of a protection assistance device of multiple circuit breakers in a low-voltage system according to a preferred embodiment of the present disclosure.
Figure 3:
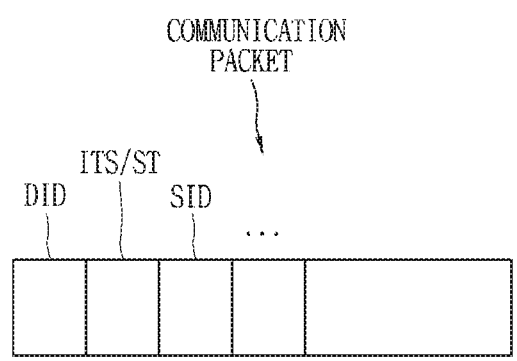
FIG. 3 is a block diagram of a communication packet according to the present disclosure.

FIG. 2 is a block diagram showing the configuration of a protection assistance device of multiple circuit breakers in a low-voltage system according to a preferred embodiment of the present disclosure, and FIG. 3 is a block diagram of a communication packet according to the present disclosure.

Referring to FIG. 2, a protection assistance device according to a preferred embodiment of the present disclosure may include at least one upper low-voltage circuit breaker 30, at least one middle low-voltage circuit breaker 20, at least one lower low-voltage circuit breaker 10-1, 10-2, and a communication line (DR).

According to a preferred embodiment of the present disclosure, the upper low-voltage circuit breaker 30, the middle low-voltage circuit breaker 20, and the lower low-voltage circuit breakers 10-1, 10-2 may include controllers 30a, 20a, 10-1a, 10-2a.

In FIG. 2, reference numeral PL2 indicates an upper power circuit and reference numeral PL1 indicates a lower power circuit.

Here, the upper power circuit (PL2) is a power line close to a power transmission side, that is, a power source side, and the lower power circuit (PL1) is a power line close to a power receiving side, that is, a load side or an end power user.

In FIG. 2, reference symbol UM PL (Uppermost Poser Line) indicates the uppermost power circuit and indicates a power line closest to a power transmission side, that is, a power source side, and reference symbol LM PL (Lowermost Power Line) indicates the lowermost power circuit and indicates a power line closest to a power receiving side, that is, a load side or an end power user.

The upper low-voltage circuit breaker 30 is connected to the first branch circuit (DL1) between the uppermost power circuit (UM PL) and the upper power circuit (PL2).

The upper low-voltage circuit breaker 30 may connect the first branch circuit (DL1) (to make the first branch circuit closed) or cut off the first branch circuit (DL1) (to make the first branch circuit open) according to the open/close position (aka ON position, OFF or trip position).

The upper low-voltage circuit breaker 30 has communication units (P1, P2).

In addition, the upper low-voltage circuit breaker 30 includes a controller 30a.

The controller 30a may be configured to include a microprocessor or a microcomputer, and may include a control and processing element such as a central processing unit and a program or data storage element such as a memory.

When a trip operation is performed to automatically cut off a circuit due to the occurrence of an abnormal current such as an overcurrent or a short circuit current in the first branch circuit (DL1) to which the upper low-voltage circuit breaker 30 is connected, the controller 30a transmits a communication packet reporting a trip operation state to at least either one of the predetermined middle low-voltage circuit breaker 20 and the low-voltage circuit breaker 10-2 through the communication line (DR).

According to a preferred aspect of the present disclosure, the controller 30a includes a program storage unit for storing a rapid spanning tree protocol (RSTP) algorithm (RSTP program) to generate and transmit the communication packet as a communication packet according to a RSTP protocol.

According to another preferred aspect of the present disclosure, the controller 30a may include a program storage unit for storing a transmission control protocol (TCP) algorithm to generate and transmit the communication packet as a communication packet according to a TCP protocol.

The communication packet according to the TCP protocol may have a structure including a destination field having identification information of a low-voltage circuit breaker to be transmitted, and a source field having identification information on a transmission source of the communication packet, a sequence number, an acknowledgment number, a check sum field for checking a communication error, and the like.

According to another preferred aspect of the present disclosure, the controller 30a may include a program storage unit for storing a user datagram protocol (UDP) algorithm to generate and transmit the communication packet as a communication packet according to a UDP protocol.

The communication packet according to the UDP protocol may have a structure including a destination field having identification information of a low-voltage circuit breaker to be transmitted, a source field having identification information on a transmission source of the communication packet, and a check thumb field for checking a communication error.

The middle low-voltage circuit breaker 20 is connected to a second branch circuit (DL2) between the upper power circuit (PL2) and the lower power circuit (PL1).

The middle low-voltage circuit breaker 20 may connect or cut off the second branch circuit (DL2) according to the opening/closing position.

The middle low-voltage circuit breaker 20 has communication units (P1, P2).

In addition, the middle low-voltage circuit breaker 20 includes a controller 20a.

The controller 20a may be configured to include a microprocessor or a microcomputer, and may include a control and processing element such as a central processing unit and a program or data storage element such as a memory.

When a trip operation is performed to automatically cut off a circuit due to the occurrence of an abnormal current in the second branch circuit (DL2) to which the middle low-voltage circuit breaker 20 is connected, the controller 20a transmits a communication packet reporting a trip operation state to at least either one of the predetermined upper low-voltage circuit breaker 30 and the low-voltage circuit breaker 10-1 through the communication line (DR).

The controller 20a may include a program storage unit for storing an RSTP algorithm (RSTP program) to generate the communication packet as a communication packet according to a RSTP protocol.

According to another preferred aspect of the present disclosure, the controller 20a may include a program storage unit for storing a TCP algorithm to generate and transmit the communication packet as a communication packet according to a TCP protocol.

The communication packet according to the TCP protocol may have a structure including a destination field having identification information of a low-voltage circuit breaker to be transmitted, and a source field having identification information on a transmission source of the communication packet, a sequence number, an acknowledgment number, a check sum field for checking a communication error, and the like According to another preferred aspect of the present disclosure, the controller 20a may include a program storage unit for storing a UDP algorithm to generate and transmit the communication packet as a communication packet according to a UDP protocol.

The communication packet according to the UDP protocol may have a structure including a destination field having identification information of a low-voltage circuit breaker to be transmitted, a source field having identification information on a transmission source of the communication packet, and a check thumb field for checking a communication error.

The lower low-voltage circuit breakers 10-1, 10-2 are connected to a third branch circuit (DL3) between the lower power circuit (PL1) and the lowermost power circuit (LM PL).

The lower low-voltage circuit breakers 10-1, 10-2 may connect or cut off the third branch circuit (DL3) according to the open/close position.

The lower low-voltage circuit breakers 10-1, 10-2 have communication units (P1, P2).

In addition, the lower low-voltage circuit breakers 10-1, 10-2 include controllers 10-1a, 10-2a.

The controller 10-1a, 10-2a may be configured to include a microprocessor or a microcomputer, and may include a control and processing element such as a central processing unit and a program or data storage element such as a memory.

When a trip operation is performed to automatically cut off a circuit due to the occurrence of an abnormal current in the third branch circuit (DL3) to which the lower low-voltage circuit breakers 10-1, 10-2 are connected, the controller 10-1a, 10-2a transmits a communication packet reporting a trip operation state to at least either one of the predetermined middle low-voltage circuit breaker 20 and the low-voltage circuit breaker 10-2 or at least either one of the predetermined upper low-voltage circuit breaker 30 and the low-voltage circuit breaker 10-1 through the communication line (DR).

In other words, when the lower low-voltage circuit breaker 10-1, 10-2 is a first lower low-voltage circuit breaker 10-1, the controller 10-1a transmits a communication packet reporting a trip operation state to at least either one of the predetermined middle low-voltage circuit breaker 20 and the lower low-voltage circuit 10-2 through the communication line (DR). When the lower low-voltage circuit breaker 10-1, 10-2 is a second lower low-voltage circuit breaker 10-2, the controller 10-2a transmits a communication packet reporting a trip operation state to at least either one of the predetermined upper low-voltage circuit breaker 30 and the lower low-voltage circuit 10-1 through the communication line (DR).

The controller 10-1a, 10-2a may include a program storage unit for storing an RSTP algorithm (RSTP program) to generate the communication packet as a communication packet according to a RSTP protocol.

According to another preferred aspect of the present disclosure, the controller 10-1a, 10-2a may include a program storage unit for storing a TCP algorithm to generate and transmit the communication packet as a communication packet according to a TCP protocol.

The communication packet according to the TCP protocol may have a structure including a destination field having identification information of a low-voltage circuit breaker to be transmitted, and a source field having identification information on a transmission source of the communication packet, a sequence number, an acknowledgment number, a check sum field for checking a communication error, and the like.

According to another preferred aspect of the present disclosure, the controller 10-1a, 10-2a may include a program storage unit for storing a UDP algorithm to generate and transmit the communication packet as a communication packet according to a UDP protocol.

The communication packet according to the UDP protocol may have a structure including a destination field having identification information of a low-voltage circuit breaker to be transmitted, a source field having identification information on a transmission source of the communication packet, and a check thumb field for checking a communication error.

The communication line (DR) communicably connects the upper low-voltage circuit breaker 30 and the middle low-voltage circuit breaker 20 and the lower low-voltage circuit breaker 10-1, 10-2.

According to a preferred aspect of the present disclosure, the upper low-voltage circuit breaker 30, the middle low-voltage circuit breaker 20 and the lower low-voltage circuit breaker 10-1, 10-2 are configured to be connected to each other in the form of a closed loop by an Ethernet communication line.

In other words, the communication line (DR) may be configured with an Ethernet communication line that connects the upper low-voltage circuit is breaker 30, the middle low-voltage circuit breaker 20, and the lower low-voltage circuit breaker 10-1, 10-2 in the form of a closed loop.

According to a preferred aspect of the present disclosure, the upper low-voltage circuit breaker 30 and the middle low-voltage circuit breaker 20 and the lower low-voltage circuit breaker 10-1, 10-2 are connected by a high-speed dual ring communication network.

In other words, the communication line (DR) may be composed of a high-speed dual ring communication network that connects the upper low-voltage circuit breaker 30, the middle low-voltage circuit breaker 20, and the lower low-voltage circuit breaker 10-1, 10-2 to each other.

Due to a configuration in which the upper low-voltage circuit breaker 30, the middle low-voltage circuit breaker 20 and the lower low-voltage circuit breaker 10-1, 10-2 are configured to be communicatively connected to the communication line (DR), which is a closed loop high-speed dual ring communication network, and therefore, the communication packet transmitted by any one of the upper low-voltage circuit breaker 30, the middle low-voltage circuit breaker 20 and the lower low-voltage circuit breaker 10-1, 10-2 may be transmitted all of the upper low-voltage circuit breaker 30, the middle low-voltage circuit breaker 20 and the lower low-voltage circuit breaker 10-1, 10-2 connected to the communication line (DR).

Referring to FIG. 2, a protection assistance device according to a preferred embodiment of the present disclosure may further include a low-voltage circuit breaker 5 additionally connected in the form of an open loop for unidirectional communication to at least any one of the upper low-voltage circuit breaker, the middle low-voltage circuit breaker, and the lower low-voltage circuit is breaker.

The low-voltage circuit breaker 5 may also include the communication units (P1, P2) and the controller 5a as described above.

For the closed loop network formed by connecting the upper low-voltage circuit breaker 30, the middle low-voltage circuit breaker 20 and the lower low-voltage circuit breaker 10-1, 10-2 to each other, the low-voltage circuit breaker 5 may be connected to a network switch or hub 6 so as to connect the closed loop network to another communication network or a higher-level monitoring device such as a remote supervisory control and data acquisition device (SCADA device), for instance.

On the other hand, according to a preferred aspect of the present disclosure, the communication packet, referring to FIG. 3, may include identification information (DID) of a destination circuit breaker, trip command information on a destination circuit breaker or status information (ITS/ST) of a source circuit breaker, and identification information (SID) of a source circuit breaker.

According to a preferred aspect of the present disclosure, the trip command information (ITS) may be configured as any one of short time delay trip information, ground fault delay trip information, and long time delay trip information.

According to a preferred aspect of the present disclosure, the status information (ST) of the source circuit breaker may include the ON or trip/OFF operation status information and self-diagnosis information of the source circuit breaker.

On the other hand, the operation of a protection assistance device of multiple circuit breakers in a low-voltage system according to the present disclosure as described above with reference to FIG. 2 will be described.

In FIG. 2, when a failure such as over current, electric shortage, or ground fault occurs at point A (point A as a point on the second branch line (DL2)), the middle circuit breaker 20 connected on the second branch line (DL2) detects such a failure and performs an automatic circuit breaking (trip) operation to cut off power supply from the upper power line (PL2) to the lower power line (PL1).

Accordingly, the lower circuit breakers 10-1, 10-2 that receive power from the lower power line (PL1) and unshown load sides that receive power through the corresponding lower circuit breakers 10-1, 10-2 are in an outage state.

At the same time, the middle circuit breaker 20 transmits communication packets through the communication units (P1, P2).

Here, the communication packet may include any one of short time delay trip information, ground fault delay trip information, and long time delay trip information, and status information (ST) of the middle circuit breaker 20 as identity information (or address information) of the upper low-voltage circuit breaker 30, identity information (or address information) of the middle circuit breaker 20, and trip command information (trip command data (ITS) for performing a protection assistance operation.

Then, the upper circuit breaker 30 may receive the communication packet through the communication units (P1, P2) to determine that the middle circuit breaker 20 has performed a trip operation, and perform a trip operation according to the trip command information (ITS).

In addition, in a protection assistance device of multiple circuit breakers in a low-voltage system according to the present disclosure, since the upper low-voltage circuit breaker 30, the middle low-voltage circuit breaker 20 and the lower low-voltage circuit breaker 10-1, 10-2 are communicably connected in the form of a closed loop through the communication line (DR), not only the upper low-voltage circuit breaker 30 but also the lower low-voltage circuit breaker 10-1, 10-2 may receive the communication packet to determine that the middle low-voltage circuit breaker 20 has performed a trip operation, and selectively store the entire communication packet or only predetermined information data (e.g., status information of the middle low-voltage circuit breaker).

Furthermore, the low-voltage circuit breaker 5 may be additionally connected to the lower low-voltage circuit breaker 10-2 in the form of an open loop, and the low-voltage circuit breaker 5 may also transmit and report information (status information, trip command information, etc.) according to the communication packet to another network or a higher-level monitoring device through the hub or network switch 6.

On the other hand, even when the middle circuit breaker 20 has failed the trip operation, the upper circuit breaker 30 that has received the communication packet performs a delay trip operation according to the trip command information, thereby cutting off power supply from the uppermost power line (not shown) to the upper power line (PL2).

At this time, a load side (not shown) that receives power through the middle circuit breaker 20, the lower circuit breakers 10-1, 10-2 and the corresponding lower circuit breakers 10-1, 10-2 that receive power supply from the upper power line (PL2) is in an outage state.

In FIG. 2, when a failure such as overcurrent, electric shortage, or ground fault occurs at point B (point B as a point on the first branch line (DL1)), the upper circuit breaker 30 connected to the first branch line (DL1) detects such a failure to perform an automatic circuit breaking (trip) operation so as to cut off power supply from the uppermost power line (not shown) to the upper power line (PL2).

In addition, in a protection assistance device of multiple circuit breakers in a low-voltage system according to the present disclosure, since the upper low-voltage circuit breaker 30, the middle low-voltage circuit breaker 20 and the lower low-voltage circuit breaker 10-1, 10-2 are communicably connected in the form of a closed loop through the communication line (DR), not only the middle low-voltage circuit breaker 20 but also the lower low-voltage circuit breaker 10-1, 10-2 may receive the communication packet to determine that the upper low-voltage circuit breaker 30 has performed a trip operation, and selectively store the entire communication packet or only predetermined information data (e.g., status information of the upper low-voltage circuit breaker).

Here, the upper low-voltage circuit breaker 30, the middle low-voltage circuit breaker 20, and the lower low-voltage circuit breaker 10-1, 10-2 may be provided with a temporary power supply element such as a battery (not shown) to enable the transmission, delivery, reception and storage of the communication packet.

Furthermore, the low-voltage circuit breaker 5 may be additionally connected to the lower low-voltage circuit breaker 10-2 in the form of an open loop, and the low-voltage circuit breaker 5 may also transmit and report information (status information, trip command information, etc.) according to the communication packet to another network or a higher-level monitoring device through the hub or network switch 6.

As described above, in a protection assistance device according to the present disclosure, an upper low-voltage circuit breaker, an middle low-voltage circuit breaker and a lower low-voltage circuit breaker may include a controller that transmits a communication packet reporting a trip operation state through a communication line to at least one of the upper low-voltage circuit breaker, the middle low-voltage circuit breaker and the lower low-voltage circuit breaker during the trip operation to enable protection assistance in both directions from the top to the bottom side or from the upper side to the upper side or from the lower side to the upper side, and wiring for protection assistance between the plurality of upper and lower circuit breakers may configured with one or two communication lines, thereby having an effect of minimizing the number of wirings.

What is claimed is:

1. A protection assistance device of multiple circuit breakers in a low-voltage system, the protection assistance device, comprising:
    at least one upper low-voltage circuit breaker connected to a first branch circuit between an uppermost power circuit and an upper power circuit, and configured to have a communication unit;
    at least one middle low-voltage circuit breaker connected to a second branch circuit between the upper power circuit and a lower power circuit, and configured to have a communication unit;
    at least one lower voltage circuit breaker connected to a third branch circuit between the lower power circuit and a lowermost power circuit, and configured to have a communication unit; and
    a communication line that communicably connects the upper low-voltage circuit breaker, the middle low-voltage circuit breaker, and the lower low-voltage circuit breaker,
    wherein the upper low-voltage circuit breaker, the middle low-voltage circuit breaker, and the lower low-voltage circuit breaker comprise:
        a controller that transmits a communication packet reporting a trip operation state to at least any one of the predetermined upper lower-voltage circuit breaker, the middle lower-voltage circuit breaker, and the lower low-voltage circuit breaker through the communication line, during a trip operation, and
    wherein the communication packet comprises identification information of a destination circuit breaker, trip command information on a destination circuit breaker, status information of a source circuit breaker, and identification information of a source circuit breaker.

2. The protection assistance device of claim 1, wherein the upper low-voltage circuit breaker, the middle low-voltage circuit breaker, and the lower low-voltage circuit breaker are configured to be connected to each other in the form of a closed loop by an Ethernet communication line.

3. The protection assistance device of claim 1, wherein the upper low-voltage circuit breaker, the middle low-voltage circuit breaker, and the lower low-voltage circuit breaker are connected to a high-speed dual ring communication network.

4. The protection assistance device of claim 1, wherein the controller comprises a program storage unit for storing a rapid spanning tree protocol (RSTP) algorithm.

5. The protection assistance device of claim 1, further comprising:
    a low-voltage circuit breaker additionally connected in the form of an open loop for unidirectional communication to at least any one of the upper low-voltage circuit breaker, the middle low-voltage circuit breaker, and the lower low-voltage circuit breaker, and communicably connected to another external communication network or a higher-level monitoring device.

6. The protection assistance device of claim 1, wherein the trip command information is composed of any one of short time delay trip information, ground fault delay trip information, and long time delay trip information.

7. The protection assistance device of claim 1, wherein the status information of the source circuit breaker comprises operation status information and self-diagnosis information of the source circuit breaker.

8. A protection assistance device of multiple circuit breakers in a low-voltage system, the protection assistance device, comprising:
    at least one upper low-voltage circuit breaker connected to a first branch circuit between an uppermost power circuit and an upper power circuit, and configured to have a communication unit;
    at least one middle low-voltage circuit breaker connected to a second branch circuit between the upper power circuit and a lower power circuit, and configured to have a communication unit;
    at least one lower voltage circuit breaker connected to a third branch circuit between the lower power circuit and a lowermost power circuit, and configured to have a communication unit; and
    a communication line that communicably connects the upper low-voltage circuit breaker, the middle low-voltage circuit breaker, and the lower low-voltage circuit breaker,
    wherein the upper low-voltage circuit breaker, the middle low-voltage circuit breaker, and the lower low-voltage circuit breaker comprise:

a controller that transmits a communication packet reporting a trip operation state to at least any one of the predetermined upper lower-voltage circuit breaker, the middle lower-voltage circuit breaker, and the lower low-voltage circuit breaker through the communication line, during a trip operation, and wherein the controller comprises a program storage unit for storing a rapid spanning tree protocol (RSTP) algorithm.

9. A protection assistance device of multiple circuit breakers in a low-voltage system, the protection assistance device, comprising:

at least one upper low-voltage circuit breaker connected to a first branch circuit between an uppermost power circuit and an upper power circuit, and configured to have a communication unit;

at least one middle low-voltage circuit breaker connected to a second branch circuit between the upper power circuit and a lower power circuit, and configured to have a communication unit;

at least one lower voltage circuit breaker connected to a third branch circuit between the lower power circuit and a lowermost power circuit, and configured to have a communication unit;

a communication line that communicably connects the upper low-voltage circuit breaker, the middle low-voltage circuit breaker, and the lower low-voltage circuit breaker, wherein the upper low-voltage circuit breaker, the middle low-voltage circuit breaker, and the lower low-voltage circuit breaker comprise:

a controller that transmits a communication packet reporting a trip operation state to at least any one of the predetermined upper lower-voltage circuit breaker, the middle lower-voltage circuit breaker, and the lower low-voltage circuit breaker through the communication line, during a trip operation; and a low-voltage circuit breaker additionally connected in the form of an open loop for unidirectional communication to at least any one of the upper low-voltage circuit breaker, the middle low-voltage circuit breaker, and the lower low-voltage circuit breaker, and communicably connected to another external communication network or a higher-level monitoring device.

* * * * *